(12) United States Patent
Podlin et al.

(10) Patent No.: US 9,254,029 B2
(45) Date of Patent: Feb. 9, 2016

(54) SWIVEL BASE FOR A TRAINING AID (71) Applicants: Pivot Point International, Inc., Evanston, IL (US); Helena Passage, Evanston, IL (US); David J. Jolivette, Chicago, IL (US)

(72) Inventors: Denise Podlin, Evanston, IL (US); Frans Passage, Neerpelt (BE); Leo Passage, Evanston, IL (US)

(73) Assignee: Pivot Point International, Chicago, IL (US)

( * ) Notice: Subject to any disclaimer, the term of this patent is extended or adjusted under 35 U.S.C. 154(b) by 0 days.

(21) Appl. No.: 14/540,257

(22) Filed: Nov. 13, 2014

(65) Prior Publication Data

US 2015/0129731 A1  May 14, 2015

Related U.S. Application Data (60) Provisional application No. 61/904,328, filed on Nov. 14, 2013.

(51) Int. Cl.
*F16M 11/08* (2006.01)
*A45D 44/14* (2006.01)

(52) U.S. Cl.
CPC ............... *A45D 44/14* (2013.01); *F16M 11/08* (2013.01)

(58) Field of Classification Search
CPC ..... F16M 11/08; F16M 11/12; F16M 11/128; F16M 11/045; F16M 11/06; F16M 2200/021; F16M 2200/024; F16M 2200/02; A45D 44/14; A47B 11/00
USPC ................. 248/186.2, 186.1, 349.1; 396/428
See application file for complete search history.

(56) References Cited

U.S. PATENT DOCUMENTS

| | | | | |
|---|---|---|---|---|
| 3,980,027 A | * | 9/1976 | Maes ..................... | A47B 11/00 108/103 |
| 5,090,823 A | * | 2/1992 | Lindsey ................. | F16C 19/52 384/493 |
| 5,725,187 A | * | 3/1998 | Vo ......................... | F16M 11/04 248/178.1 |
| 2004/0065234 A1 | * | 4/2004 | Bullock ................ | A47B 11/00 108/22 |

* cited by examiner

*Primary Examiner* — Christopher Garft
(74) *Attorney, Agent, or Firm* — Reed Smith LLP (57) ABSTRACT

A swivel base for use with a training aid having a top member and a bottom member, the top member for receiving a training aid and the bottom member for receiving a holder or stand. The top member is coupled to a ball bearing and a mounting member fixedly coupled to the bottom member is rotatably coupled to the ball bearing to allow the top member to rotate relative to the bottom member. A locking mechanism which has a locking pin coupled to the bottom member secures the top member in one or more stationary positions.

15 Claims, 8 Drawing Sheets

SWIVEL BASE FOR A TRAINING AID

CROSS-REFERENCE TO RELATED APPLICATIONS

This application claims priority from U.S. Provisional Patent Application No. 61/904,328, filed on Nov. 14, 2013, which is incorporated herein by reference.

BACKGROUND

The present invention relates to a swivel base for use with a training aid, such as a hairdressing training aid or a headform for hair styling practice and instruction. A headform is a three dimensional model of a human head. Some headforms have hair similar to human hair. Headforms having hair are used in hairdressing training by instructors for demonstration and instruction in hairdressing techniques. Headforms may also be used in hairdressing instruction by students to practice hairdressing techniques. During instruction of students using a headform, there exists a need to provide students with a 360 degree view of the headform, while also being able to prevent rotation of the headform when desired and to stably support the headform to demonstrate hairdressing techniques.

SUMMARY

The swivel base of the present invention comprises a top member and a bottom member, and is used to couple a hairdressing training aid to a stand such as a tripod stand or a vice holder. The base provides swivel functionality to allow a user to rotate the headform about the stand. In a preferred embodiment, the top member comprises a circular protrusion; and, a ball bearing is secured around outer perimeter of the protrusion, such as by press-fitting the border of the ball bearing to the outer perimeter of the protrusion. A circular mounting member is secured to the ball bearing, such as by press fitting the inner rim of the mounting member to the outer border of the ball bearing. The mounting member is thus rotatably coupled to the top member via the ball bearing. To couple the mounting member to the bottom member, and thus rotatably couple the top member to the bottom member, the bottom member comprises a circular void corresponding in shape to the mounting member. The circular void receives the mounting member. The bottom member further comprises one or more threaded holes in the void corresponding to holes in the mounting member. Screws are threaded through the holes of the bottom member and into the holes in the mounting member to couple bottom member to the mounting member. With the mounting member coupled to bottom member, the top member rotates about the ball bearing 180 degrees in both directions with respect to the bottom member when the bottom member is stationary and coupled to a stand.

The base further includes a locking mechanism for securing the top member in one or more stationary positions. A locking pin support member is coupled to the bottom member through a locking pin opening, and a locking pin is inserted through and spring-loaded within the locking pin support member. The locking pin is of a length such that the head of the locking pin extends through the locking pin opening and beyond the top surface of the bottom member. In a preferred embodiment, the locking pin further includes a foot, and the locking pin support member includes a notch into which the foot is fitted to further secure the locking pin in place. The top member includes one or more holes into which the head of the locking pin can fit to prevent rotation of, or lock in a stationary position, the top member. When locked in a stationary position, the foot of the locking pin fits within the notch, and the head of the locking pin is extended beyond the top surface of the bottom member and engaged into a hole. To unlock and allow rotation of the top member, the locking pin is pulled downward partially out of the locking pin support member, compressing the spring, and the head of the locking pin recedes into the opening. When pulling the locking pin in this manner, the foot is also removed from the notch. The locking pin can be secured in this rotatable state by rotating the locking pin and resting the foot on the rim of the locking pin support member, which is further held in this position from the force of the compressed spring pulling the locking pin into the locking pin support member with the head receded into opening. With head receded into the opening, the top member can freely rotate about bottom member.

Other objects, advantages, features, properties and relationships of the invention will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 7:
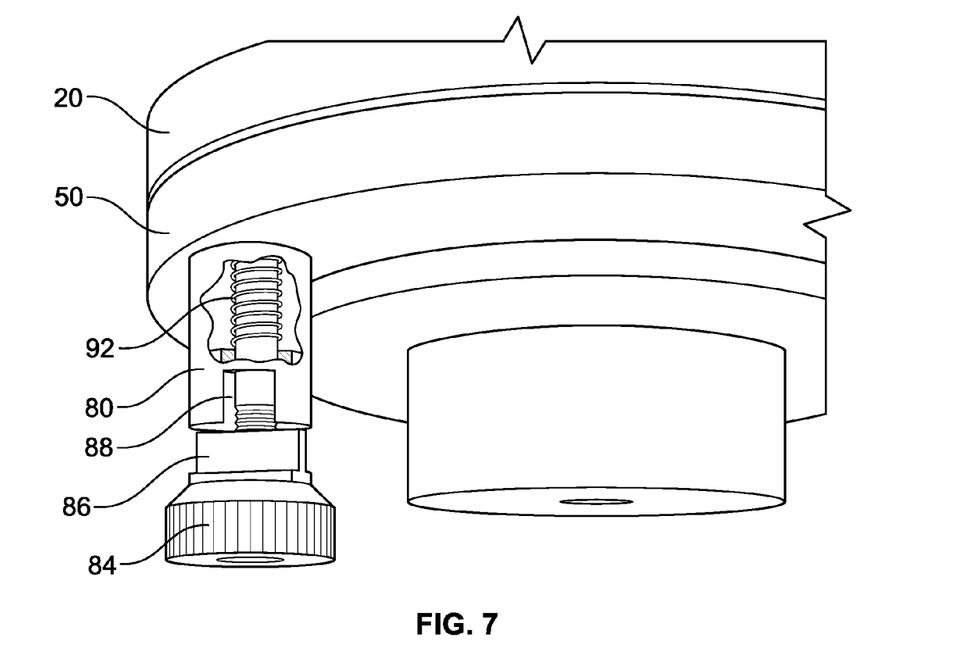
FIG. 7 is a perspective view of a portion of the swivel base of FIG. 1 showing the notch of the locking pin resting on the rim of the locking pin support member and securing top member in a rotatable state.
Figure 8:
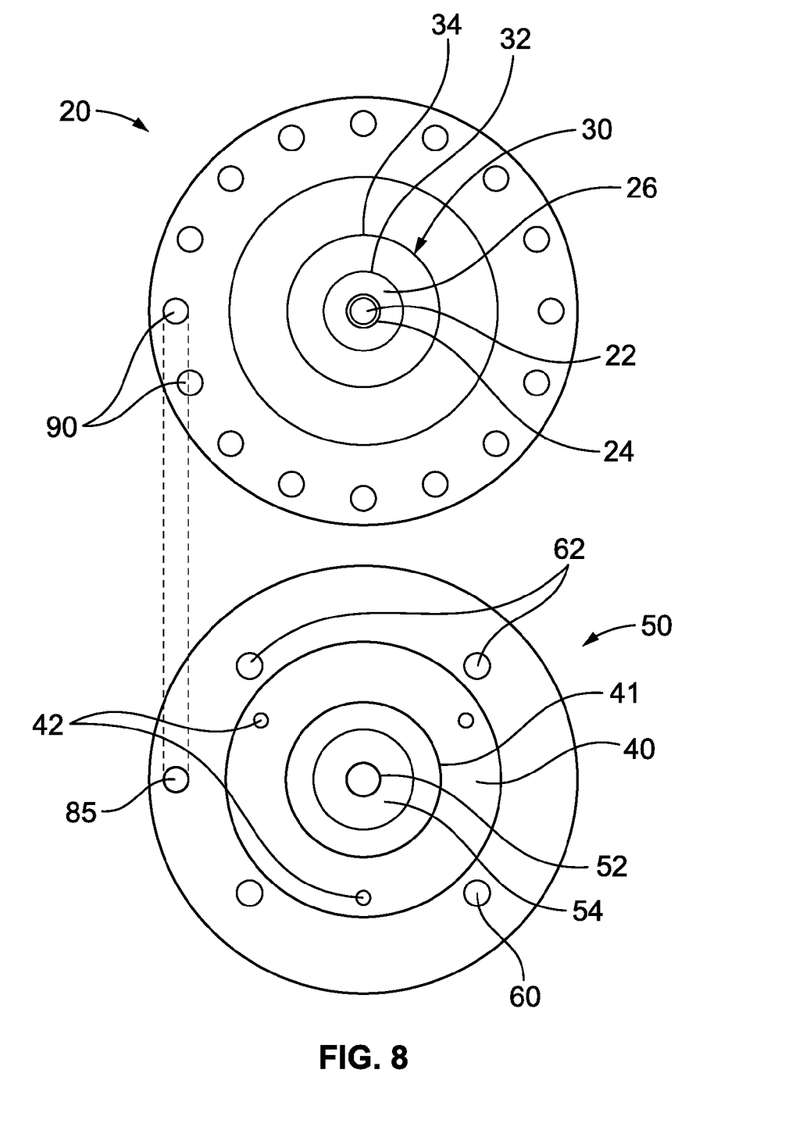
FIG. 8 is a view of the bottom of the top member and the top of the bottom member of the swivel base with a mounting member attached thereto of FIG. 1.
Figure 9:
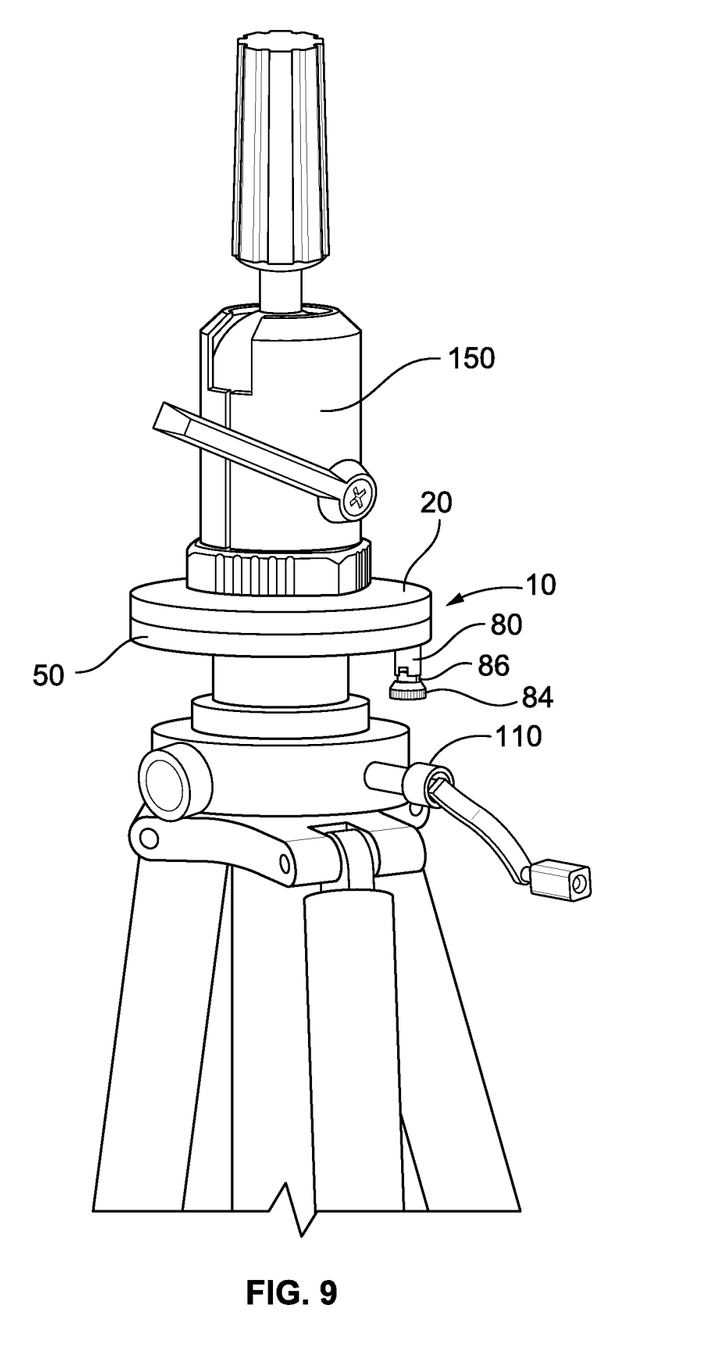
FIG. 9 is a perspective view of a swivel base installed on a tripod stand and with a headform stand installed thereon.
Figure 10:
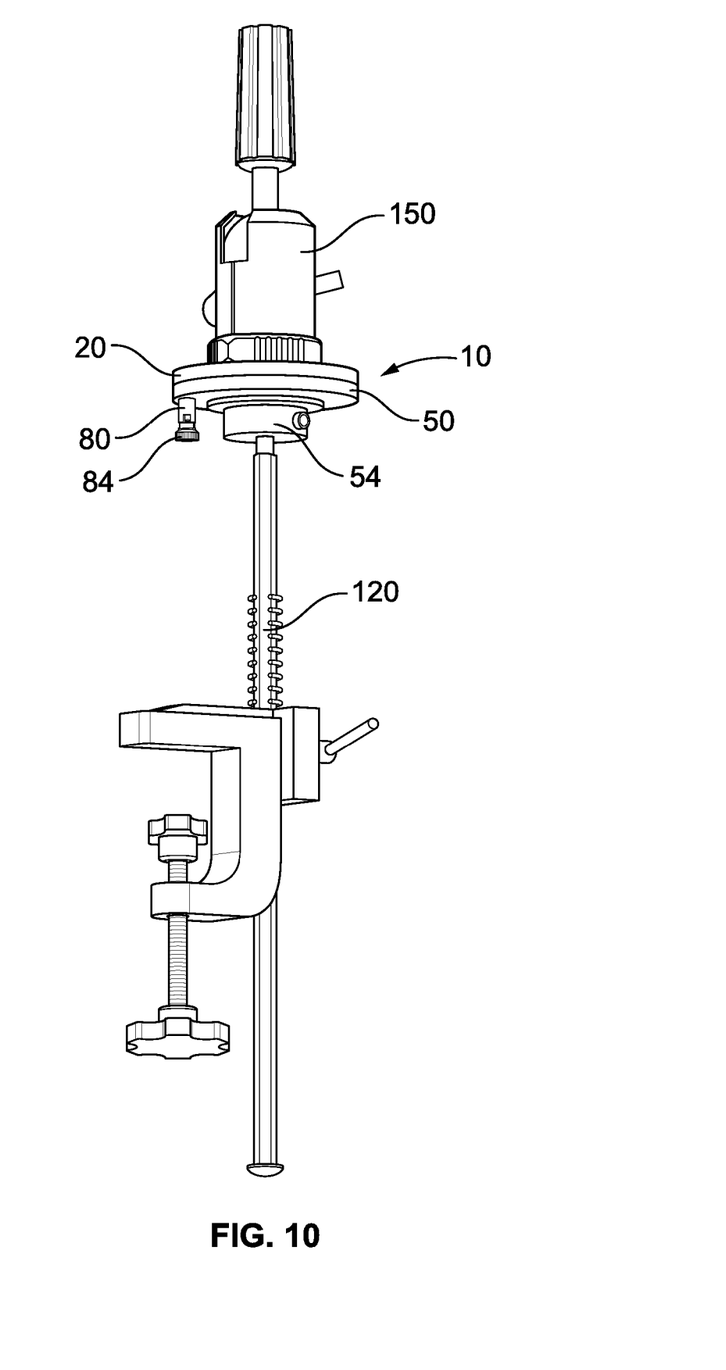
FIG. 10 is a bottom perspective view of a swivel base installed on a vice holder stand and with a headform stand installed thereon.
Figure 11:
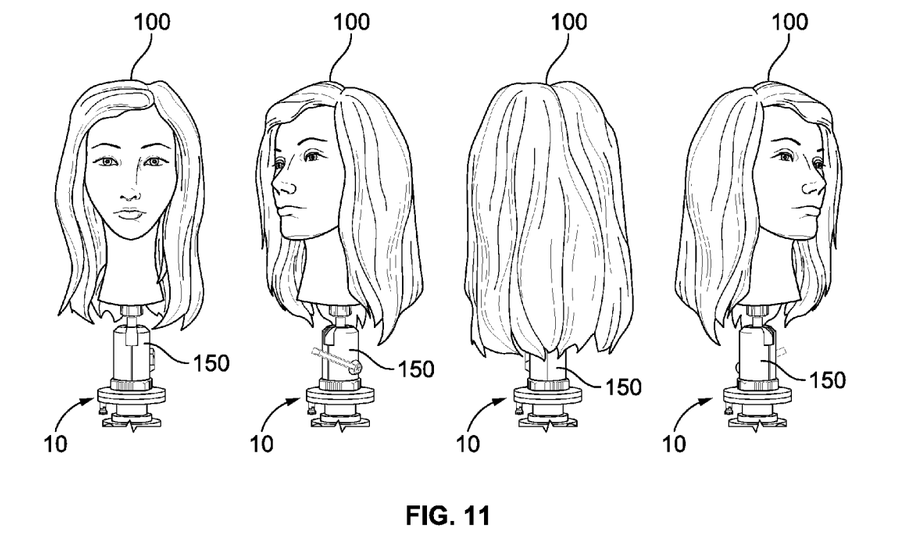
FIG. 11 is a front view of a of a swivel base installed on a tripod stand and with a headform stand and headform installed thereon, with the headform shown at four different positions of rotation.

FIGS. 1-11 show a preferred embodiment of a swivel base 10 for use with any type of training aid, in this case a hairdressing training aid 100, such as a headform for hair styling practice and instruction. Base 10 comprises a top member 20 and a bottom member 50. As seen in FIGS. 9-11, the base 10 is used to couple a hairdressing training aid to a stand such as a tripod stand 110 or a vice holder 120. To couple the base 10 to a stand, a stand screw (not shown) is threaded into a threaded hole (not shown) of the stand at one end, and threaded into a threaded hole 52 in the bottom member 50 of the base 10. A headform support 150 for supporting the headform 100 is then coupled to the top member 20 of the base 10 using a support screw 22. To couple the headform support 150 to the base 10, the support screw 22 is threaded into a threaded aperture 24 of the top member 20 at one end, and then threaded into a threaded socket (not shown) of headform support 150 at the other end.

Figure 6:
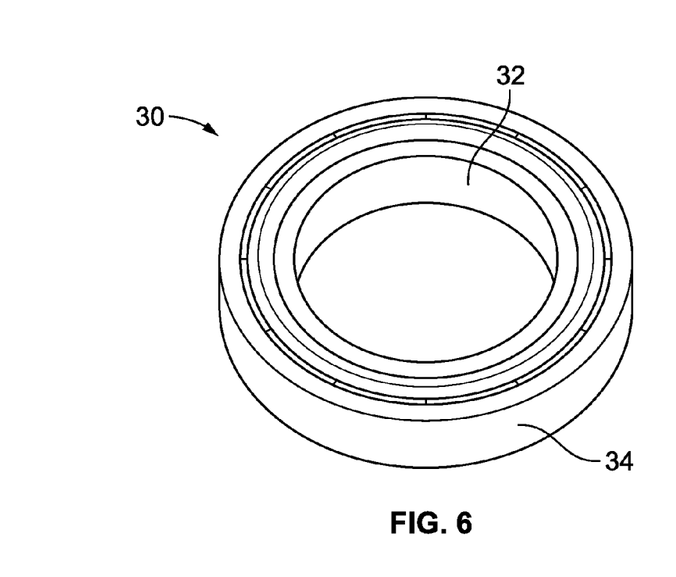
FIG. 6 is a perspective view of an example ball bearing used with a swivel base in accordance with the present invention.

As seen in FIGS. 1-5, the base 10 further provides swivel functionality to allow a user to rotate the headform about the stand. In a preferred embodiment, the top member 20 comprises a protrusion 26 through which the threaded aperture 24 passes. A ball bearing 30, such as a sealed double-shielded ball bearing as shown in FIG. 6, is secured around outer perimeter of protrusion 26, such as by press-fitting the inner border 32 of the ball bearing 30 to the outer perimeter of protrusion 26. A 6902Z Quality Rolling Ball Bearing, available from VXB Ball Bearings, is used in a preferred embodiment, but other rolling ball bearings are also contemplated. A circular mounting member 40 is secured to the ball bearing 30, such as by press fitting an inner rim 41 of the mounting member 40 to an outer border 34 of the ball bearing 30. The mounting member 40 is thus rotatably coupled to the top member 20 via the ball bearing 30. To couple the mounting member 40 to the bottom member 50, thus rotatably coupling the top member 20 to the bottom member 50, the bottom member 50 comprises a circular void 54 corresponding in size and shape to the mounting member 40 for receiving the mounting member 40. One or more threaded holes 56 in void 54 area correspond to holes 42 in mounting member 40, and screws 58 are threaded through holes 56 of bottom member 50 and into holes 42 in mounting member 40 to couple bottom member 50 to mounting member 40. With the mounting member 40 coupled to the bottom member 50, the top member 20 rotates about the ball bearing 30 180 degrees in both directions with respect to the bottom member 50 when the bottom member 50 is stationary and coupled to a stand.

Figure 1:
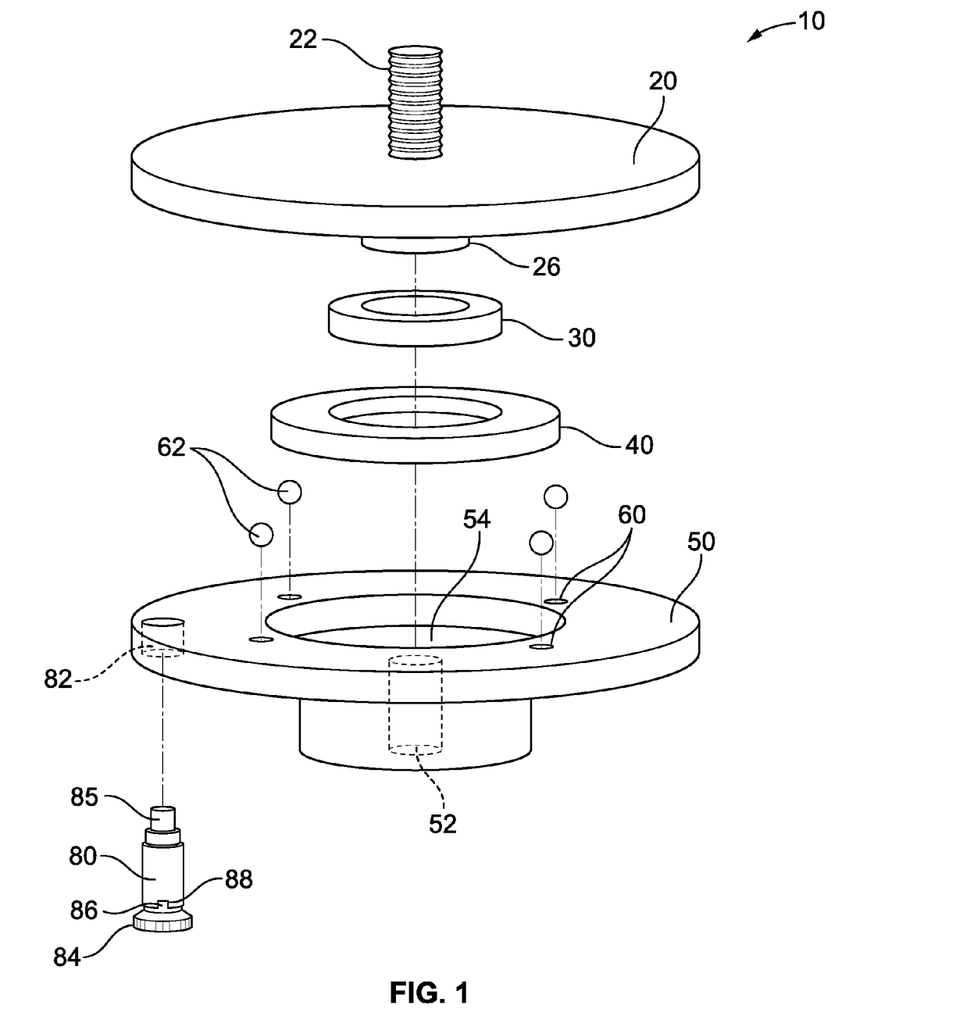
FIG. 1 is an exploded schematic view of one embodiment of a swivel base in accordance with the present invention.
Figure 2:
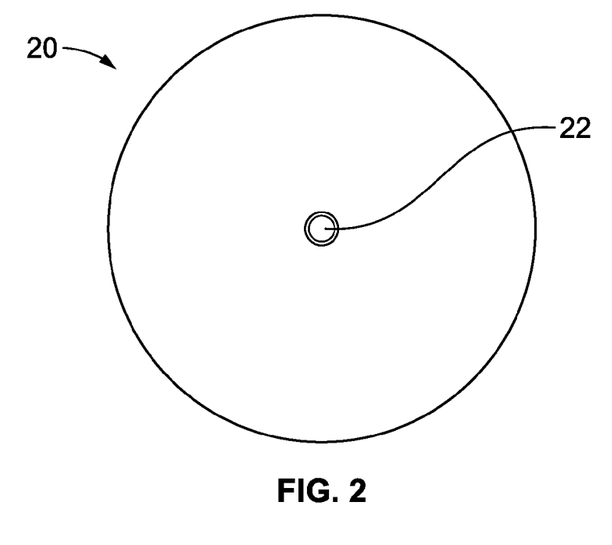
FIG. 2 is a top view of the top member of the swivel base of FIG. 1.
Figure 4:
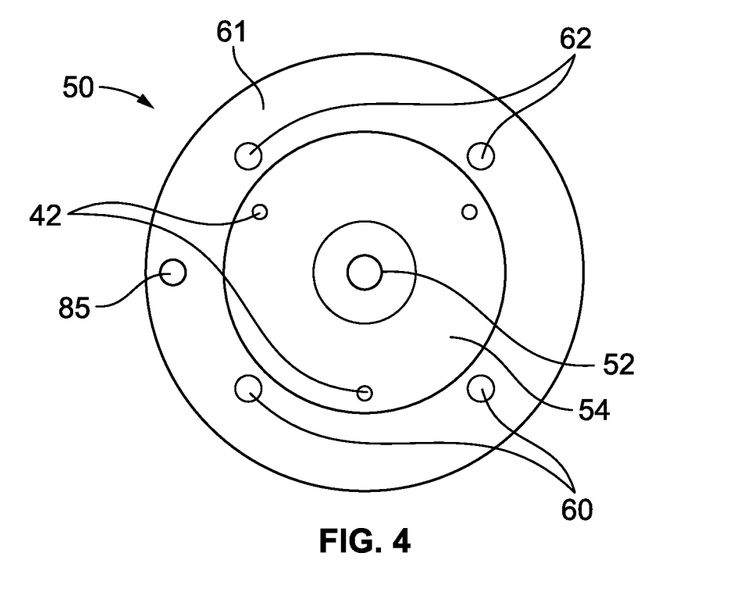
FIG. 4 is a top view of the bottom member of the swivel base of FIG. 1.
Figure 5:
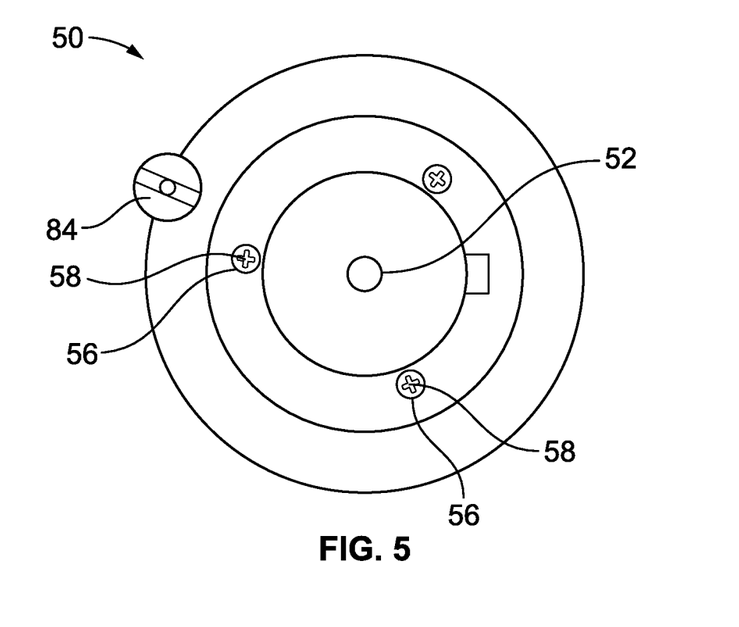
FIG. 5 is a bottom view of the bottom member of the swivel base of FIG. 1.

As seen in FIGS. 1 and 4, the bottom member 50 may further include one or more slots 60 formed in planar surface 61 on the top side of bottom member 50 into which ball bearings 62 are coupled to prevent any incidental contact between the top member 20 and the bottom member 50 during rotation. When bottom member is coupled to top member 20, the ball bearings 62 rotatably contact planar surface 23 formed on the bottom of the top member 20 and opposed to the bottom member surface 61.

As seen in FIGS. 1-5 and 7-8, the base 10 further includes a locking mechanism for securing the top member 20 in one or more stationary positions and preventing rotation of the top member 20 relative to the bottom member 50. A locking pin support member 80 is coupled to the bottom member 50 through the locking pin opening 82, and a locking pin 84 is inserted through and spring-loaded within the locking pin support member 80. The locking pin 84 is of a length such that, in the locked position, the head 85 of the locking pin 84 extends through the locking pin opening 82 and beyond the top surface of the bottom member 50. In a preferred embodiment, the locking pin further includes a foot 86, and the locking pin support member 80 includes a notch 88 into which the foot 86 is fitted to further secure the locking pin 84 in place.

Figure 3:
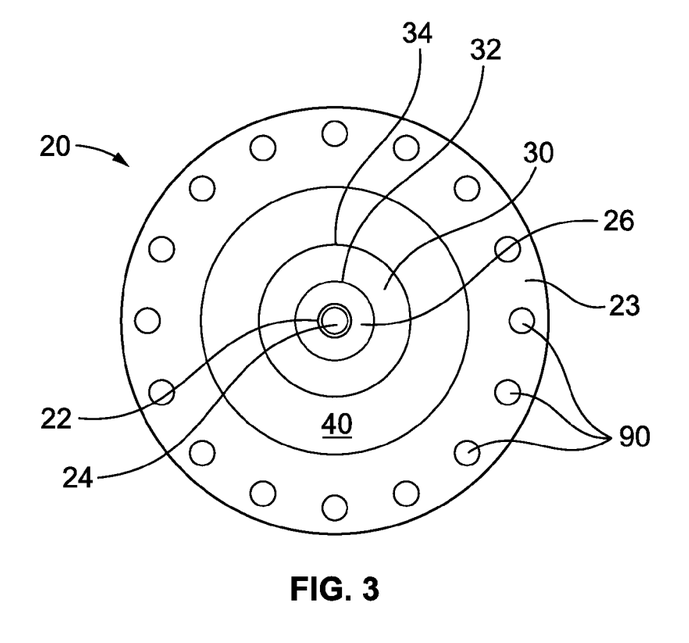
FIG. 3 is a bottom view of the top member of the swivel base of FIG. 1.

The planar surface 23 on the underside of the top member 20 includes one or more holes 90 positioned such that the head 85 of the locking pin 84 can fit into a hole 90 to prevent the rotation of, or lock in a stationary position, the top member 20. A plurality of holes 90 provide a corresponding plurality of positions in which the top member 20, and attached headform, can be secured. As seen in FIGS. 3 and 8, in a preferred embodiment sixteen holes 90 are provided generally around the perimeter of the top member 20 to allow a user to secure the headform attached to the top member 20 to be secured in sixteen different stationary positions for viewing and use; however, additional or fewer holes 90 can be machined into underside of top member 20 to allow more or fewer stationary positions. When locked in a stationary position, the spring 92 is in a neutral position, the head 85 of the locking pin 84 is extended beyond the top surface of the bottom member 50 and engaged into a hole 90, and the foot 86 is engaged in the notch 88 to further secure the locking pin 84 in place.

To unlock and allow rotation of the top member 20 relative to bottom member 50, the locking pin 84 is pulled downward partially out of the locking pin support member 80, compressing the spring 92, and the head 85 of locking pin 84 recedes into the opening 82. When pulling the locking pin 84 in this manner, the foot 86 is also removed from the notch 88. As shown in FIG. 7, the locking pin 84 can be secured in this rotatable state by rotating the locking pin 84 and resting the foot 86 on the rim of the locking pin support member 80, which is further held in this position from the force of the compressed spring 92 pulling the locking pin 84 into the locking pin support member 80 with the head 85 recessed into the opening 82. With the head 85 receded into the opening 82, the top member 20 can freely rotate relative to the bottom member 50 about a common central axis.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A swivel base for mounting a hairdressing training aid to a stand, the swivel base comprising:
   a top member, the top member comprising an aperture for securing the hairdressing training aid thereto and further comprising a circular protrusion, the circular protrusion having an outer perimeter;
   a bottom member, the bottom member having a circular void and comprising an aperture for securing the bottom member to the stand, wherein the bottom member further has an upper surface;
   a ball bearing, the ball bearing having an inner border and an outer border, wherein the inner border of the ball bearing is coupled to the outer perimeter of the circular protrusion;
   a circular mounting member corresponding to the circular void of the bottom member, the circular mounting member having an inner rim, wherein the inner rim of the circular mounting member is coupled to the outer border of the ball bearing;

a hole on an underside of the top member;

a locking pin support member coupled to an opening in the bottom member; and a locking pin inserted through the locking pin support member and coupled thereto by a spring, and wherein a head of the locking pin is sized to fit within the hole of the top member;

wherein the circular mounting member is fit within the void and is secured to the bottom member using one or more screws inserted through corresponding threaded apertures in mounting member and bottom member;

wherein the protrusion of the top member rotates relative to the bottom member about a central axis of the ball bearing to rotate the hairdressing training aid about the stand;

wherein in an unlocked position the spring is in a compressed position and the head of the locking pin is recessed within the opening, allowing the top member to rotate freely about the bottom member; and wherein in a locked position the head of the locking pin extends beyond the upper surface of the bottom member and fits within the hole to secure top member in a locked position.

2. The swivel base of claim 1, wherein the bottom member further comprises one or more apertures for securing ball bearings therein.

3. The swivel base of claim 1, wherein the locking pin further comprises a foot and the locking pin support member further comprises a notch corresponding in shape to the foot.

4. The swivel base of claim 3, wherein when in a locked position the foot fits within the notch.

5. The swivel base of claim 3, wherein when in an unlocked position the locking pin is rotated and the foot rests on a rim of the locking pin support member to secure the locking pin with the head of the locking pin recessed within the opening.

6. A swivel base for mounting a hairdressing training aid to a stand, the swivel base comprising:

a top member comprising an aperture for securing the hairdressing training aid thereto and further comprising a circular protrusion;

a bottom member having a circular void and comprising an aperture for securing the bottom member to the stand;

a cylindrical ball bearing having an inner border and an outer border, wherein the inner border of the ball bearing is coupled to the outer perimeter of the circular protrusion;

a hole on an underside of the top member;

a locking pin support member coupled to an opening in the bottom member; and a locking pin inserted through the locking pin support member and coupled thereto by a spring, and wherein a head of the locking pin is sized to fit within the hole of the top member;

a circular mounting member corresponding to the circular void of the bottom member, the circular mounting member having an inner rim, wherein the inner rim of the circular mounting member is coupled to the outer border of the ball bearing;

wherein the circular mounting member is fit within the void and is secured to the bottom member using one or more screws inserted through corresponding threaded apertures in mounting member and bottom member; and wherein the top member rotates relative to the stationary mounting member to rotate the hairdressing training aid about the stand.

7. The swivel base of claim 6, wherein the locking pin further comprises a foot and the locking pin support member further comprises a notch corresponding in shape to the foot.

8. The swivel base of claim 7, wherein when in a locked position the foot fits within the notch.

9. The swivel base of claim 7, wherein when in an unlocked position the locking pin is rotated and the foot rests on a rim of the locking pin support member to secure the locking pin with the head of the locking pin recessed within the opening.

10. The swivel base of claim 7, wherein in an unlocked position the spring is in a compressed position and the head of the locking pin is recessed within the opening, allowing the top member to rotate freely about the bottom member; and wherein in a locked position the spring is in a neutral position and the head of the locking pin extends beyond the upper surface of the bottom member and fits within the hole to secure top member in a locked position.

11. A swivel base for mounting a hairdressing training aid to a stand, the swivel base comprising:

a top member comprising an aperture for securing the hairdressing training aid thereto;

a planar surface of the top member;

a bottom member comprising an aperture for securing the bottom member to the stand;

a planar surface of the bottom member opposite the top member and housing a plurality of bearings;

a cylindrical ball bearing having an inner border and an outer border, wherein the inner border of the ball bearing is coupled to the top member;

a circular mounting member having an inner rim coupled to the outer border of the ball bearing;

a hole on an underside of the top member;

a locking pin support member coupled to an opening in the bottom member; and a locking pin inserted through the locking pin support member and wherein a head of the locking pin is sized to fit within the hole of the top member;

wherein the circular mounting member is secured to the bottom member using one or more fasteners; and wherein the top member rotates relative to the bottom member about a central axis of the base.

12. The swivel base of claim 11, wherein the locking pin further comprises a foot opposite the head of the locking ping.

13. The swivel base of claim 12 further comprising a spring biasing the locking pin foot against the locking pin support member.

14. The swivel base of claim 11 further comprising a void in the bottom member into which the mounting member extends.

15. The swivel base of claim 11, wherein the portion of the top member coupled to the cylindrical ball bearing is a protrusion.

* * * * *